(12) United States Patent
Raghoebardajal et al.

(10) Patent No.: US 11,405,531 B2
(45) Date of Patent: Aug. 2, 2022

(54) DATA PROCESSING

(71) Applicant: Sony Interactive Entertainment Inc., Tokyo (JP)

(72) Inventors: Sharwin Winesh Raghoebardajal, London (GB); Ian Henry Bickerstaff, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 115 days.

(21) Appl. No.: 16/954,307

(22) PCT Filed: Dec. 20, 2018

(86) PCT No.: PCT/GB2018/053723
§ 371 (c)(1),
(2) Date: Jun. 16, 2020

(87) PCT Pub. No.: WO2019/122901
PCT Pub. Date: Jun. 27, 2019

(65) Prior Publication Data
US 2021/0084197 A1 Mar. 18, 2021

(30) Foreign Application Priority Data
Dec. 20, 2017 (GB) .................................. 1721422

(51) Int. Cl.
*H04N 5/04* (2006.01)
*A63F 13/213* (2014.01)
(Continued)

(52) U.S. Cl.
CPC ............ *H04N 5/04* (2013.01); *A63F 13/213* (2014.09); *A63F 13/26* (2014.09); *G02B 27/017* (2013.01);
(Continued)

(58) Field of Classification Search
CPC ...... A63F 13/211; A63F 13/213; A63F 13/26; H04N 5/04; H04N 5/2257; G06F 3/011;
(Continued)

(56) References Cited

U.S. PATENT DOCUMENTS 8,615,383 B2 * 12/2013 Dobbins ................. G06F 3/011
703/1
10,296,105 B2 * 5/2019 Fujimaki ................. G06F 3/017
(Continued)

FOREIGN PATENT DOCUMENTS

| CA | 3046077 A1 * | 6/2018 | ........... G02B 27/017 |
| EP | 1439649 A1 * | 7/2004 | ............. G06F 3/002 |

(Continued)

OTHER PUBLICATIONS

Examination Report for corresponding GB Application No. GB1721422. 2, 4 pages, dated Jun. 10, 2021.
(Continued)

*Primary Examiner* — Vinh T Lam
(74) *Attorney, Agent, or Firm* — Matthew B. Dernier, Esq.

(57) ABSTRACT

Data processing apparatus includes a camera to capture successive images according to an image capture period; an optically detectable indicator having multiple optically detectable states and configured to transition between the multiple optically detectable states according to a transition pattern having interspersed periods in the multiple optically detectable states; the transition pattern including a reference period and two or more second periods which are shorter than the image capture period and which are separated by a separation period different to the image capture period; and a processor to detect timing information from images captured by the camera of the optically detectable indicator.

20 Claims, 15 Drawing Sheets

(51) Int. Cl.
  *A63F 13/26* (2014.01)
  *G06T 7/00* (2017.01)
  *G06T 7/70* (2017.01)
  *H04N 5/225* (2006.01)
  *G02B 27/01* (2006.01)

(52) U.S. Cl.
  CPC .............. *G06T 7/70* (2017.01); *G06T 7/97* (2017.01); *H04N 5/2257* (2013.01); *G06T 2207/30204* (2013.01)

(58) Field of Classification Search
  CPC .... G06F 3/0346; G06F 3/0304; G06F 3/0325; G06F 3/038; G06T 7/97; G06T 7/70; G06T 2207/30204; G02B 27/017
  See application file for complete search history.

(56) References Cited

U.S. PATENT DOCUMENTS

| | | | | |
|---|---|---|---|---|
| 10,477,355 | B1* | 11/2019 | Niranjayan | ........... A61B 5/1113 |
| 2004/0161246 | A1 | 8/2004 | Matsushita | |
| 2005/0105772 | A1 | 5/2005 | Voronka | |
| 2014/0063054 | A1* | 3/2014 | Osterhout | ............... G06F 3/005 345/633 |
| 2014/0225916 | A1* | 8/2014 | Theimer | ............ H04B 10/1149 345/633 |
| 2015/0296149 | A1* | 10/2015 | Laroia | ................. G02B 17/008 348/239 |
| 2016/0187653 | A1* | 6/2016 | Kimura | .................. G06T 11/60 345/8 |
| 2016/0364910 | A1 | 12/2016 | Higgins | |
| 2017/0045736 | A1* | 2/2017 | Fu | ........................ G02B 27/017 |
| 2017/0237488 | A1 | 8/2017 | Aoyama | |
| 2017/0295360 | A1* | 10/2017 | Fu | ......................... H04N 13/398 |
| 2018/0001198 | A1* | 1/2018 | Frappiea | ................. A63F 13/49 |
| 2018/0115683 | A1 | 4/2018 | Lee | |
| 2018/0144554 | A1* | 5/2018 | Watola | ..................... G06F 3/013 |
| 2019/0122439 | A1* | 4/2019 | Thiebaud | .............. G06T 19/006 |
| 2019/0215505 | A1* | 7/2019 | Ishii | ..................... H04N 13/332 |
| 2020/0278539 | A1* | 9/2020 | Petljanski | .......... G02B 27/0172 |
| 2021/0084197 | A1 | 3/2021 | Raghoebardajal | |

FOREIGN PATENT DOCUMENTS

| | | | |
|---|---|---|---|
| EP | 3107225 A1 | 12/2016 | |
| EP | 3467585 A1 | 4/2019 | |
| EP | 3729235 A1 | 10/2020 | |
| KR | 101767662 B1 | 8/2017 | |
| WO | WO-03036829 A1 * | 5/2003 | ............. G06F 3/002 |
| WO | WO-2015058150 A1 * | 4/2015 | .......... G02B 13/001 |
| WO | 2019122901 A1 | 6/2019 | |

OTHER PUBLICATIONS

Combined Search and Examination Report for corresponding GB Application No. GB1721422.2, 5 pages, dated Apr. 23, 2020.
International Search Report and Written Opinion for corresponding PCT Application No. PCT/GB2018/053723, 15 pages, dated Mar. 7, 2019.
Examination Report for corresponding GB Application No. GB1721422. 2, 4 pages, dated Jan. 7, 2022.

* cited by examiner

DATA PROCESSING

BACKGROUND

Field of the Disclosure

This disclosure relates to virtual reality systems and methods.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

A head-mountable display (HMD) is one example of a head-mountable apparatus for use in a virtual reality system in which an HMD wearer views a virtual environment. In an HMD, an image or video display device is provided which may be worn on the head or as part of a helmet. Either one eye or both eyes are provided with small electronic display devices.

It has been proposed to provide detection arrangements for detecting a relative location of one device (such as an HMD) from another device, by using a camera on the one device to detect images of one or more markers, for example on the other device.

Although the original development of HMDs and virtual reality was perhaps driven by the military and professional applications of these devices, HMDs are becoming more popular for use by casual users in, for example, computer game or domestic computing applications.

The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY

An example embodiment provides data processing apparatus comprising:

a camera to capture successive images according to an image capture period;

an optically detectable indicator having multiple optically detectable states and configured to transition between the multiple optically detectable states according to a transition pattern having interspersed periods in the multiple optically detectable states;

the transition pattern including a reference period and two or more second periods which are shorter than the image capture period and which are separated by a separation period different to the image capture period; and a processor to detect timing information from images captured by the camera of the optically detectable indicator.

Another example embodiment provides a data processing device comprising:

a camera to capture successive images according to an image capture period of an optically detectable indicator having multiple optically detectable states and configured to transition between the multiple optically detectable states according to a transition pattern having interspersed periods in the multiple optically detectable states, the transition pattern including a reference period and two or more second periods which are shorter than the image capture period and which are separated by a separation period different to the image capture period; and a processor to detect timing information from images captured by the camera of the optically detectable indicator.

Another example embodiment provides a data processing method comprising:

capturing successive images according to an image capture period;

transitioning an optically detectable indicator having multiple optically detectable states between the multiple optically detectable states according to a transition pattern having interspersed periods in the multiple optically detectable states, the transition pattern including a reference period and two or more second periods which are shorter than the image capture period and which are separated by a separation period different to the image capture period; and detecting timing information from images captured by the camera of the optically detectable indicator.

Another example embodiment provides a data processing method comprising:

capturing successive images according to an image capture period of an optically detectable indicator having multiple optically detectable states and configured to transition between the multiple optically detectable states according to a transition pattern having interspersed periods in the multiple optically detectable states, the transition pattern including a reference period and two or more second periods which are shorter than the image capture period and which are separated by a separation period different to the image capture period; and detecting timing information from images captured by the camera of the optically detectable indicator.

Example embodiments provide computer software which, when executed by a computer, causes the computer to perform the steps of any one of the methods defined above.

Example embodiments provide a machine-readable, non-transitory storage medium which stores such computer software.

Various other aspects and features of the present disclosure are defined in the appended claims and within the text of the accompanying description and include at least a head mountable apparatus such as a display and a method of operating a head-mountable apparatus as well as a computer program.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
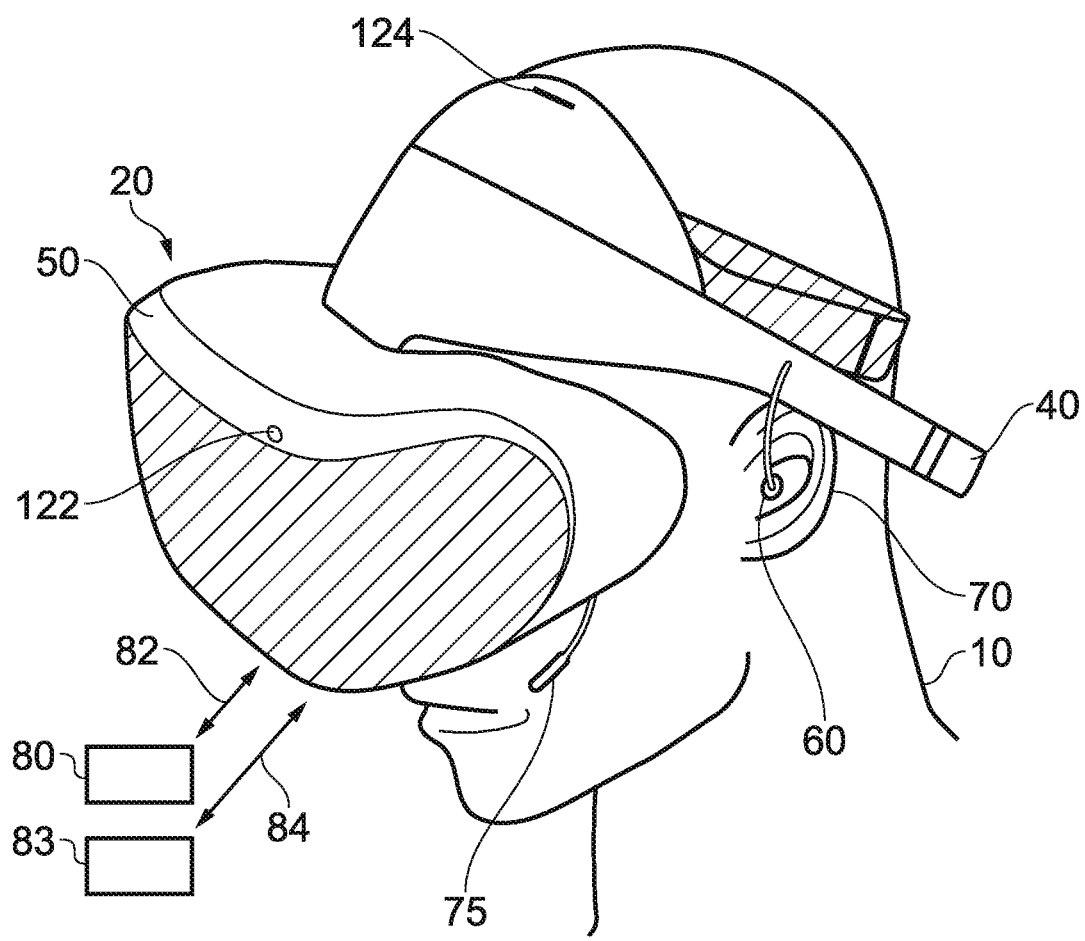
FIG. 1 schematically illustrates an HMD worn by a user.

Referring now to FIG. 1, a user 10 is wearing an HMD 20 (as an example of a generic head-mountable apparatus or virtual reality apparatus). The HMD comprises a frame 40, in this example formed of a rear strap and a top strap, and a display portion 50.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD.

The HMD has associated headphone audio transducers or earpieces 60 which fit into the user's left and right ears 70. The earpieces 60 replay an audio signal provided from an external source, which may be the same as the video signal source which provides the video signal for display to the user's eyes. A boom microphone 75 is mounted on the HMD so as to extend towards the user's mouth.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection 82. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable 84 to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the disclosure are applicable to an HMD having at least one electrical and/or optical cable linking the HMD to another device, such as a power supply and/or a video (and/or audio) signal source. So, embodiments of the disclosure can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply;

(d) an HMD having a wireless connection to a video and/or audio signal source and a cabled connection to a power supply; or (e) an HMD having its own video and/or audio signal source and its own power supply (both as part of the HMD arrangement).

If one or more cables are used, the physical position at which the cable 82 and/or 84 enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables 82, 84 relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
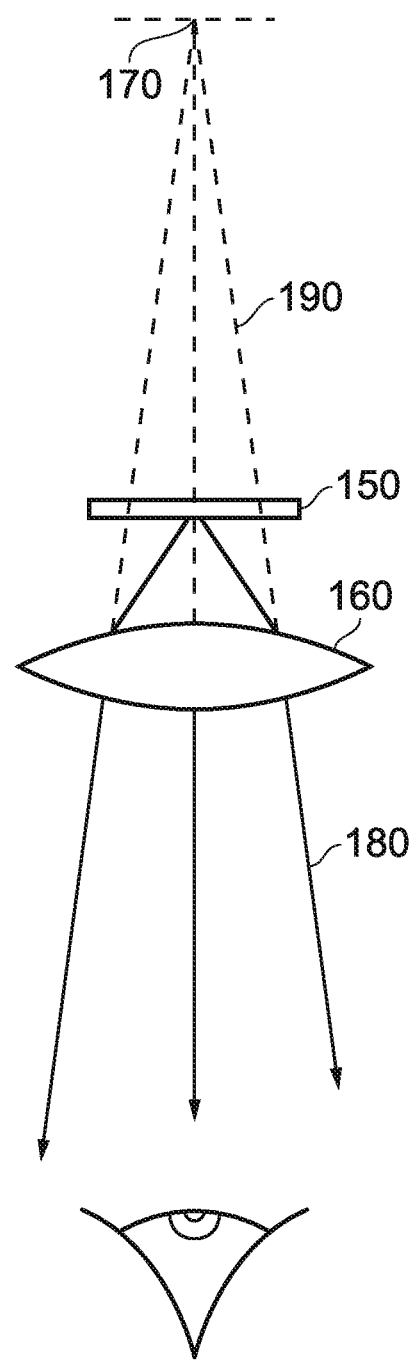
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
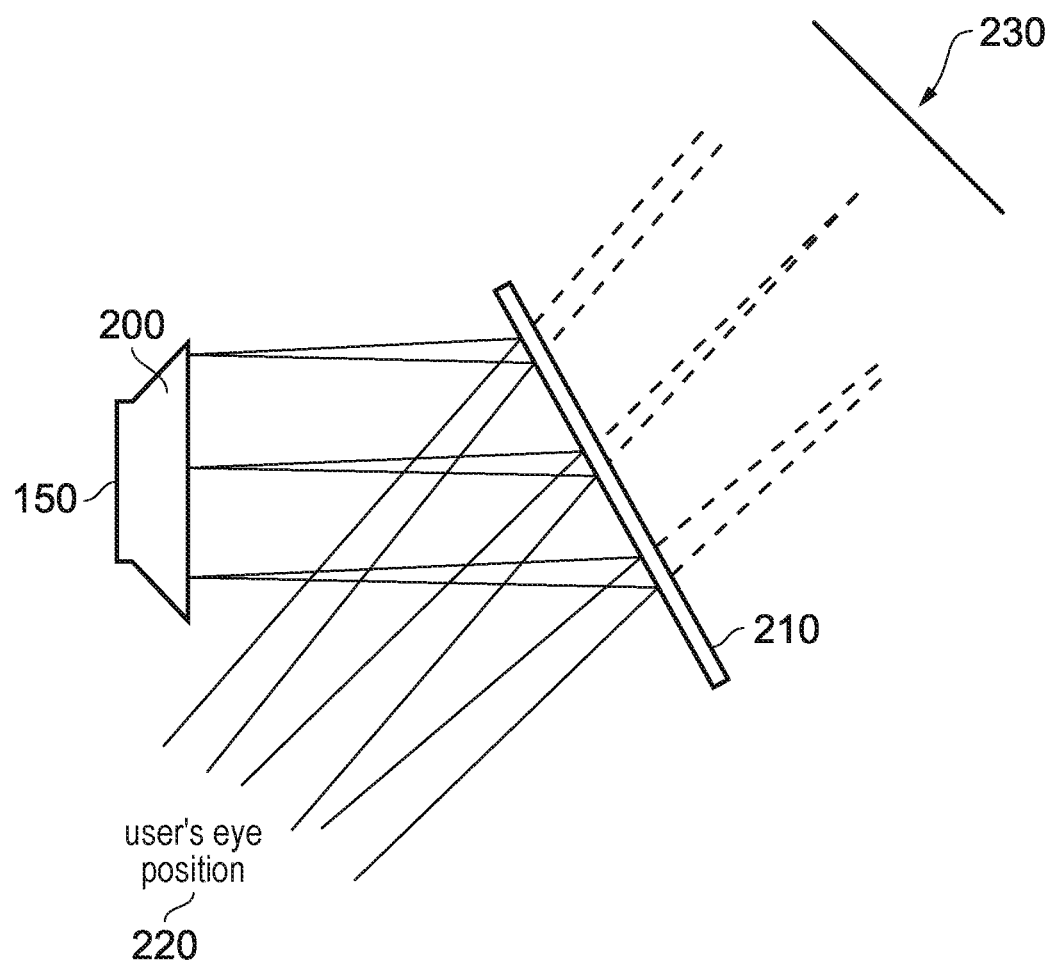
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

Figure 6:
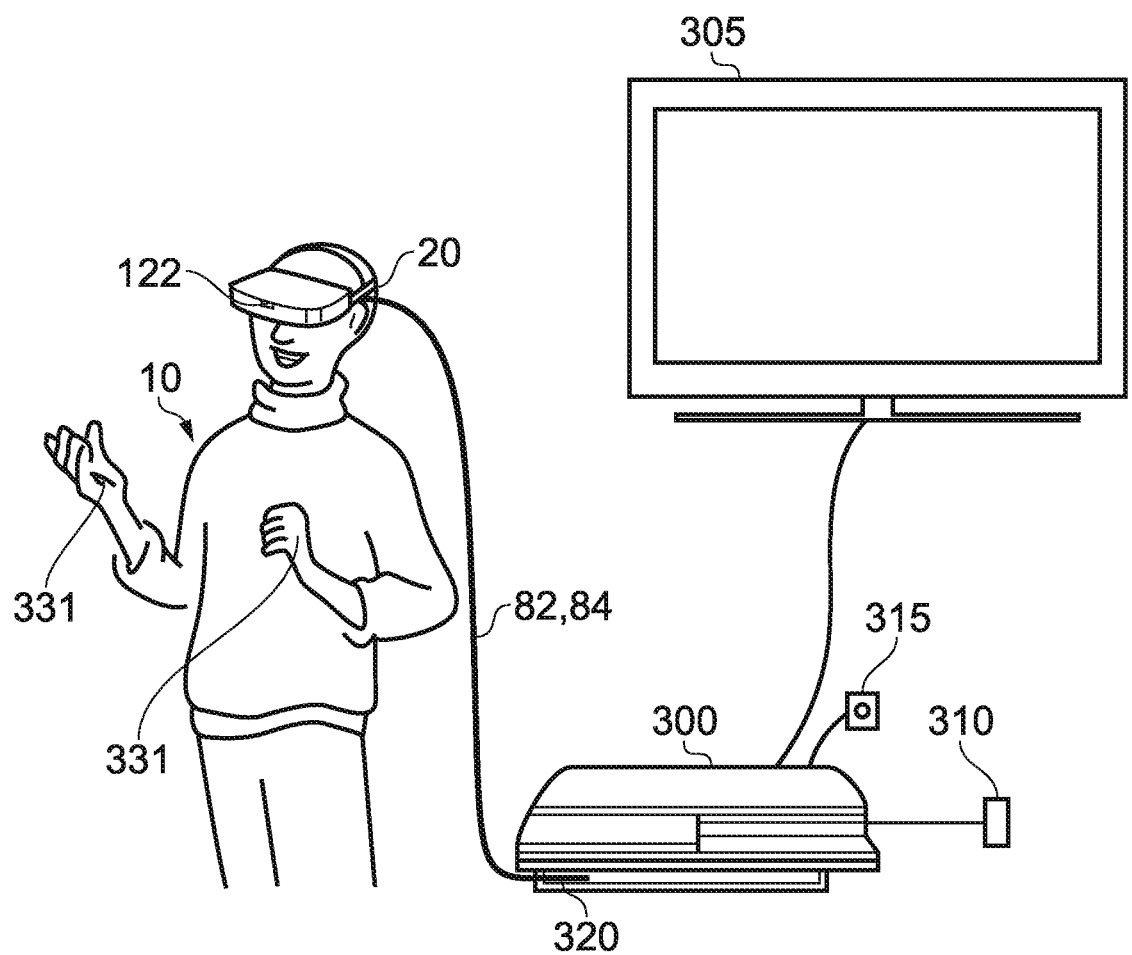
FIGS. 6 and 7 schematically illustrate a user wearing an HMD connected to a Sony® PlayStation 3® games console.

FIG. 6 schematically illustrates an example virtual reality system and in particular shows a user wearing an HMD connected to a Sony® PlayStation 3® games console 300 as an example of a base device. The games console 300 is connected to a mains power supply 310 and (optionally) to a main display screen (not shown). A cable, acting as the cables 82, 84 discussed above (and so acting as both power supply and signal cables), links the HMD 20 to the games console 300 and is, for example, plugged into a USB socket 320 on the console 300. Note that in the present embodiments, a single physical cable is provided which fulfils the functions of the cables 82, 84.

The video displays in the HMD 20 are arranged to display images generated by the games console 300, and the earpieces 60 in the HMD 20 are arranged to reproduce audio signals generated by the games console 300. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 122 mounted on the HMD 20 are passed back to the games console 300 via the cable 82, 84.

Similarly, if motion or other sensors are provided at the HMD 20, signals from those sensors may be at least partially processed at the HMD 20 and/or may be at least partially processed at the games console 300. The use and processing of such signals will be described further below.

The USB connection from the games console 300 also provides power to the HMD 20, according to the USB standard.

FIG. 6 also shows a separate display 305 such as a television or other openly viewable display (by which it is meant that viewers other than the HMD wearer may see images displayed by the display 305) and a camera 315, which may be (for example) directed towards the user (such as the HMD wearer) during operation of the apparatus. An example of a suitable camera is the PlayStation Eye camera, although more generally a generic "webcam", connected to the console 300 by a wired (such as a USB) or wireless (such as WiFi or Bluetooth) connection.

The display 305 may be arranged (under the control of the games console) to provide the function of a so-called "social screen". It is noted that playing a computer game using an HMD can be very engaging for the wearer of the HMD but less so for other people in the vicinity (particularly if they are not themselves also wearing HMDs). To provide an improved experience for a group of users, where the number of HMDs in operation is fewer than the number of users, images can be displayed on a social screen. The images displayed on the social screen may be substantially similar to those displayed to the user wearing the HMD, so that viewers of the social screen see the virtual environment (or a subset, version or representation of it) as seen by the HMD wearer. In other examples, the social screen could display other material such as information relating to the HMD wearer's current progress through the ongoing computer game. For example, the HMD wearer could see the game environment from a first person viewpoint whereas the social screen could provide a third person view of activities and movement of the HMD wearer's avatar, or an overview of a larger portion of the virtual environment. In these examples, an image generator (for example, a part of the functionality of the games console) is configured to generate some of the virtual environment images for display by a display separate to the head mountable display.

In FIG. 6 the user is wearing one or two so-called haptic gloves 331. These can include actuators to provide haptic feedback to the user, for example under the control of processing carried out by the console 300. They may also provide configuration and/or location sensing as discussed below.

Note that other haptic interfaces can be used, providing one or more actuators and/or one or more sensors. For example, a so-called haptics suit may be worn by the user. Haptic shoes may include one or more actuators and one or more sensors. Or the user could stand on or hold a haptic interface device. The one or more actuators associated with these devices may have different respective frequency responses and available amplitudes of vibration. Therefore in example arrangements to be discussed below the haptic generator can be responsive to attributes defining one or capabilities of the haptic interface. In some examples, an attribute defines a frequency response of the haptic interface. In some examples, an attribute defines a maximum amplitude which may be represented by the haptic interface.

Figure 7:
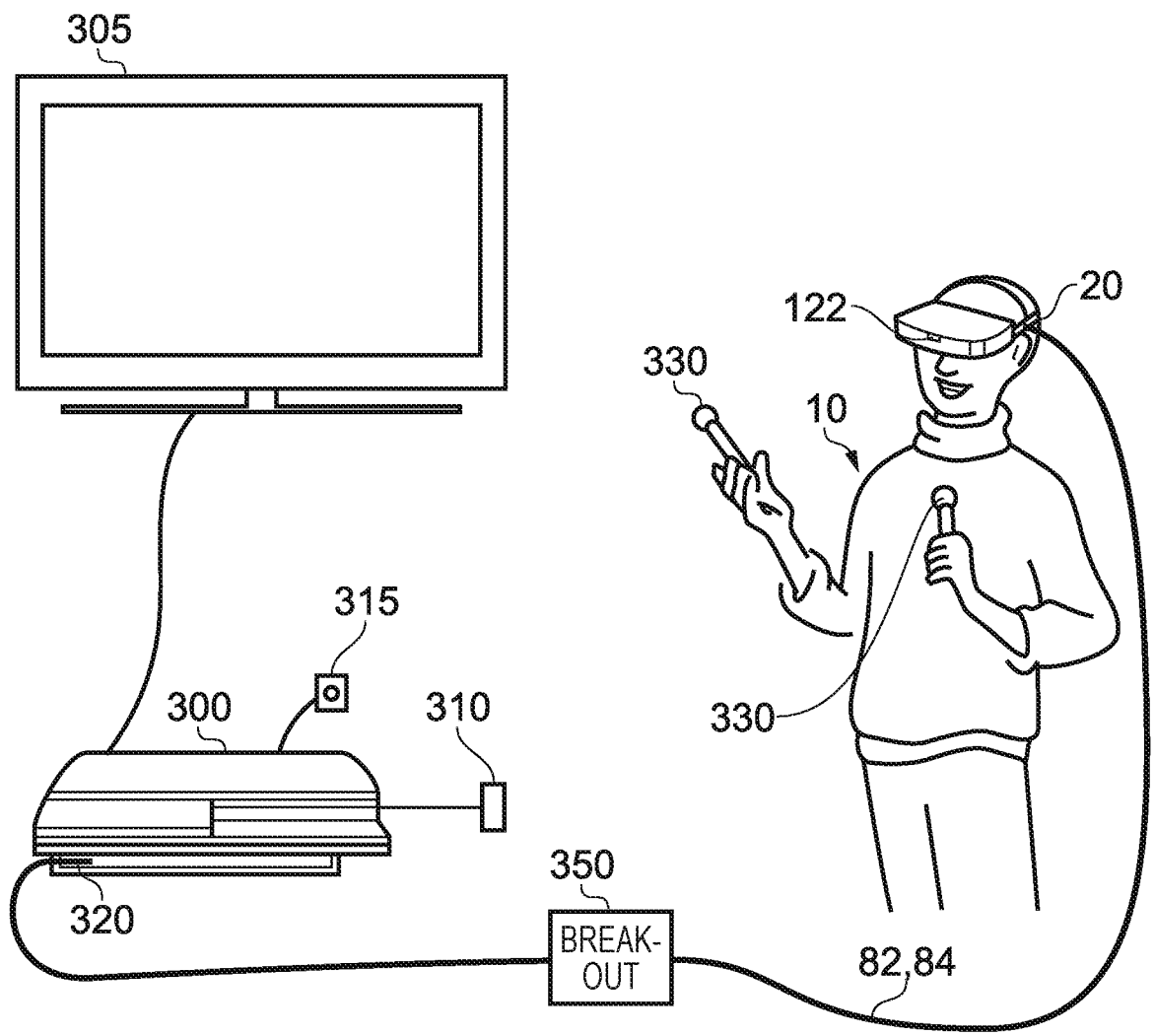

FIG. 7 schematically illustrates a similar arrangement (another example of a virtual reality system) in which the games console is connected (by a wired or wireless link) to a so-called "break out box" acting as a base or intermediate device 350, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 350 is fixed to the ground or to a piece of furniture, but rather than having a very long trailing cable from the games console 300, the break-out box provides a locally weighted point so that the cable 82, 84 linking the HMD 20 to the break-out box will tend to move around the position of the break-out box. This can improve user safety and comfort by avoiding the use of very long trailing cables.

In FIG. 7, the user is also shown holding a pair of hand-held controller 330s which may be, for example, Sony® Move® controllers which communicate wirelessly with the games console 300 to control (or to contribute to the control of) game operations relating to a currently executed game program. the user may also be wearing one or two haptic gloves as discussed in connection with FIG. 6.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 8:
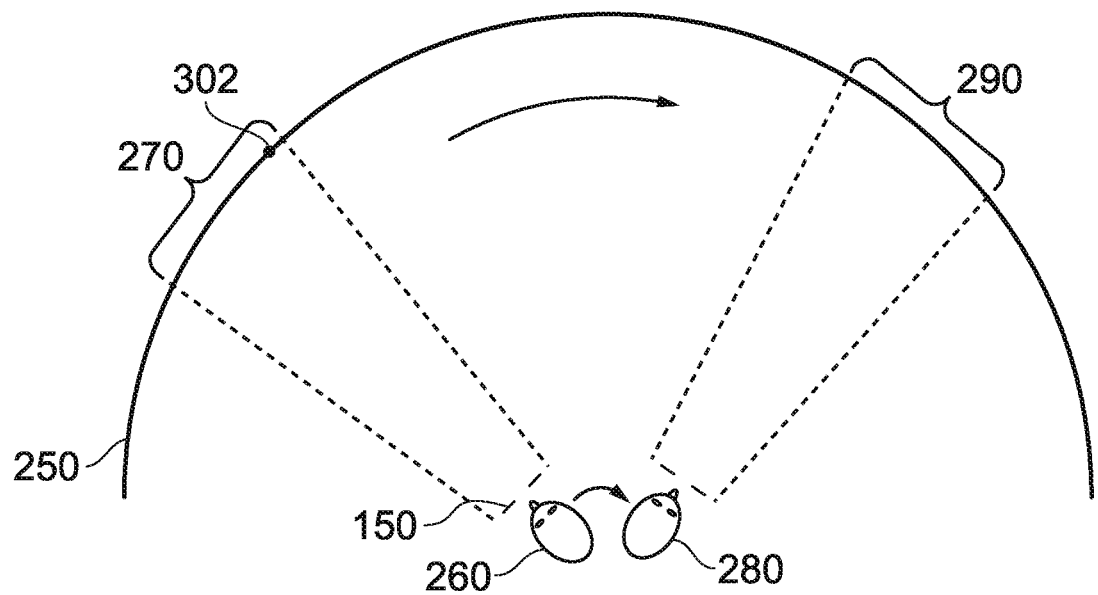
FIG. 8 schematically illustrates a change of view of user of an HMD.

FIG. 8 schematically illustrates the effect of a user head movement in a VR or AR system.

Referring to FIG. 8, a virtual environment is represented by a (virtual) spherical shell 250 around a user. This provides an example of a virtual display screen (VDS). Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD. It can be seen from the drawing that the VDS subsists in three dimensional space (in a virtual sense) around the position in space of the HMD wearer, such that the HMD wearer sees a current portion of VDS according to the HMD orientation.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 8, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment.

Figure 2:
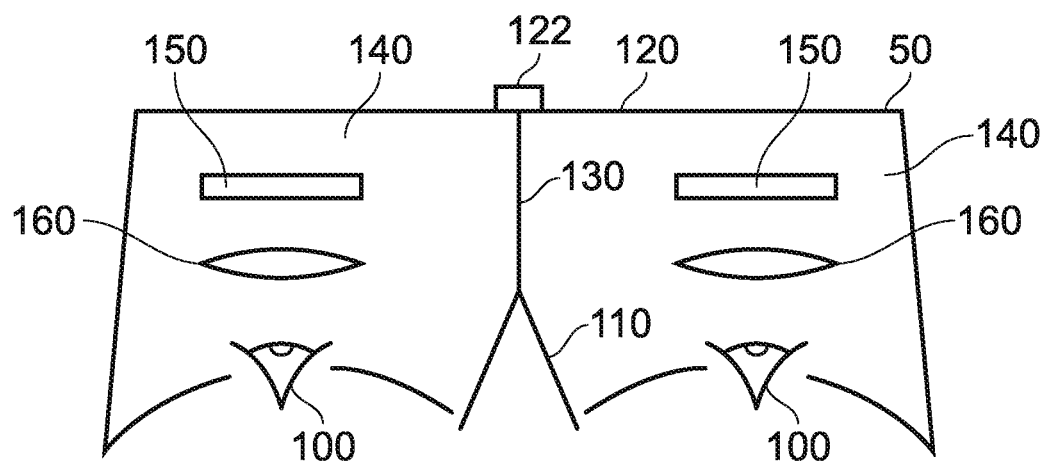
FIG. 2 is a schematic plan view of an HMD.
Figure 9A:
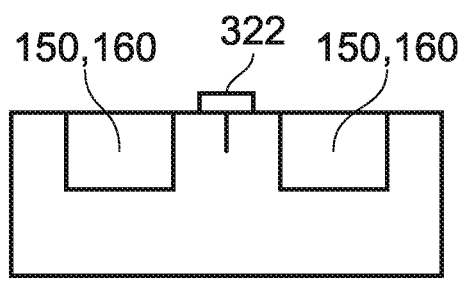
FIGS. 9a and 9b schematically illustrate HMDs with motion sensing.
Figure 9B:
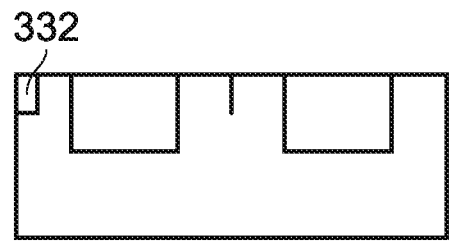

FIGS. 9a and 9b schematically illustrated HMDs with motion sensing. The two drawings are in a similar format to that shown in FIG. 2. That is to say, the drawings are schematic plan views of an HMD, in which the display element 150 and optical elements 160 are represented by a simple box shape. Many features of FIG. 2 are not shown, for clarity of the diagrams. Both drawings show examples of HMDs with a motion detector for detecting motion of the observer's head.

In FIG. 9a, a forward-facing camera 322 is provided on the front of the HMD. This may be the same camera as the camera 122 discussed above, or may be an additional camera. This does not necessarily provide images for display to the user (although it could do so in an augmented reality arrangement). Instead, its primary purpose in the present embodiments is to allow motion sensing. A technique for using images captured by the camera 322 for motion sensing will be described below in connection with FIG. 10. In these arrangements, the motion detector comprises a camera mounted so as to move with the frame; and an image comparator operable to compare successive images captured by the camera so as to detect inter-image motion.

FIG. 9b makes use of a hardware motion detector 332. This can be mounted anywhere within or on the HMD. Examples of suitable hardware motion detectors are piezoelectric accelerometers or optical fibre gyroscopes. It will of course be appreciated that both hardware motion detection and camera-based motion detection can be used in the same device, in which case one sensing arrangement could be used as a backup when the other one is unavailable, or one sensing arrangement (such as the camera) could provide data for changing the apparent viewpoint of the displayed images, whereas the other (such as an accelerometer) could provide data for image stabilisation.

Figure 10:
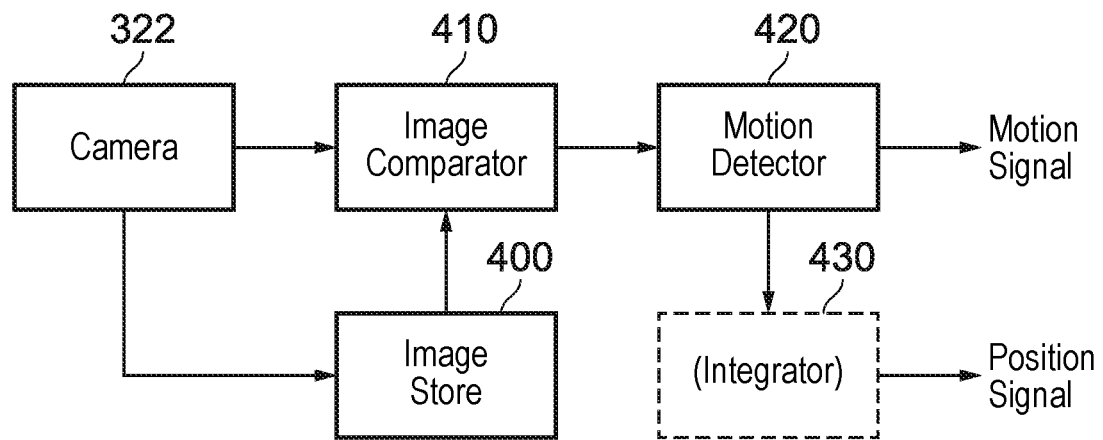
FIG. 10 schematically illustrates a position sensor based on optical flow detection.

FIG. 10 schematically illustrates one example of motion detection using the camera 322 of FIG. 9a.

The camera 322 is a video camera, capturing images at an image capture rate of, for example, 25 images per second. As each image is captured, it is passed to an image store 400 for storage and is also compared, by an image comparator 410, with a preceding image retrieved from the image store. The comparison uses known block matching techniques (so-called "optical flow" detection) to establish whether substantially the whole image has moved since the time at which the preceding image was captured. Localised motion might indicate moving objects within the field of view of the camera 322, but global motion of substantially the whole image would tend to indicate motion of the camera rather than of individual features in the captured scene, and in the present case because the camera is mounted on the HMD, motion of the camera corresponds to motion of the HMD and in turn to motion of the user's head.

The displacement between one image and the next, as detected by the image comparator 410, is converted to a signal indicative of motion by a motion detector 420. If required, the motion signal is converted by to a position signal by an integrator 430.

As mentioned above, as an alternative to, or in addition to, the detection of motion by detecting inter-image motion between images captured by a video camera associated with the HMD, the HMD can detect head motion using a mechanical or solid state detector 332 such as an accelerometer. This can in fact give a faster response in respect of the indication of motion, given that the response time of the video-based system is at best the reciprocal of the image capture rate. In some instances, therefore, the detector 332 can be better suited for use with higher frequency motion detection. However, in other instances, for example if a high image rate camera is used (such as a 200 Hz capture rate camera), a camera-based system may be more appropriate. In terms of FIG. 10, the detector 332 could take the place of the camera 322, the image store 400 and the comparator 410, so as to provide an input directly to the motion detector 420. Or the detector 332 could take the place of the motion detector 420 as well, directly providing an output signal indicative of physical motion.

Other position or motion detecting techniques are of course possible. For example, a mechanical arrangement by which the HMD is linked by a moveable pantograph arm to a fixed point (for example, on a data processing device or on a piece of furniture) may be used, with position and orientation sensors detecting changes in the deflection of the pantograph arm. In other embodiments, a system of one or more transmitters and receivers, mounted on the HMD and on a fixed point, can be used to allow detection of the position and orientation of the HMD by triangulation techniques. For example, the HMD could carry one or more directional transmitters, and an array of receivers associated with known or fixed points could detect the relative signals from the one or more transmitters. Or the transmitters could be fixed and the receivers could be on the HMD. Examples of transmitters and receivers include infra-red transducers, ultrasonic transducers and radio frequency transducers. The radio frequency transducers could have a dual purpose, in that they could also form part of a radio frequency data link to and/or from the HMD, such as a Bluetooth® link.

Figure 11:
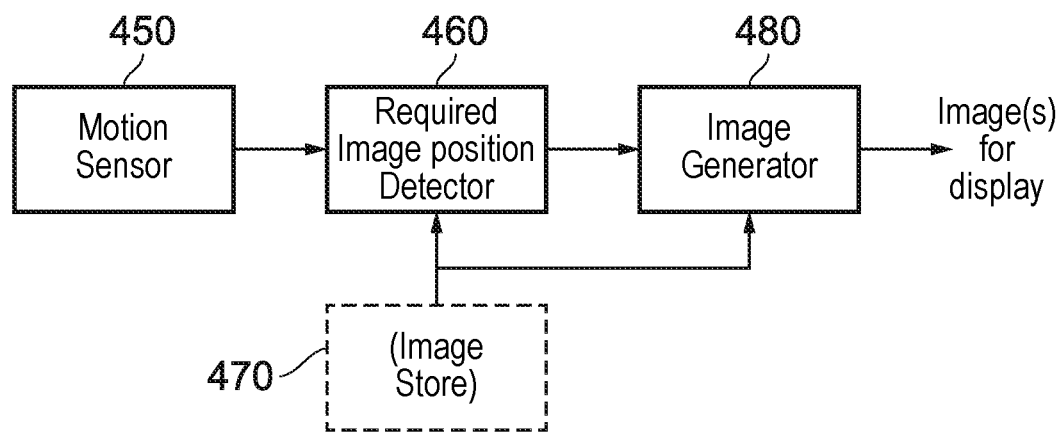
FIG. 11 schematically illustrates image processing carried out in response to a detected position or change in position of an HMD.

FIG. 11 schematically illustrates image processing carried out in response to a detected position or change in position of the HMD.

As mentioned above in connection with FIG. 10, in some applications such as virtual reality and augmented reality arrangements, the apparent viewpoint of the video being displayed to the user of the HMD is changed in response to a change in actual position or orientation of the user's head.

With reference to FIG. 11, this is achieved by a motion sensor 450 (such as the arrangement of FIG. 10 and/or the motion detector 332 of FIG. 9b) supplying data indicative of motion and/or current position to a required image position detector 460, which translates the actual position of the HMD into data defining the required image for display. An image generator 480 accesses image data stored in an image store 470 if required, and generates the required images from the appropriate viewpoint for display by the HMD. The external video signal source can provide the functionality of the image generator 480 and act as a controller to compensate for the lower frequency component of motion of the observer's head by changing the viewpoint of the displayed image so as to move the displayed image in the opposite direction to that of the detected motion so as to change the apparent viewpoint of the observer in the direction of the detected motion.

Figure 12:
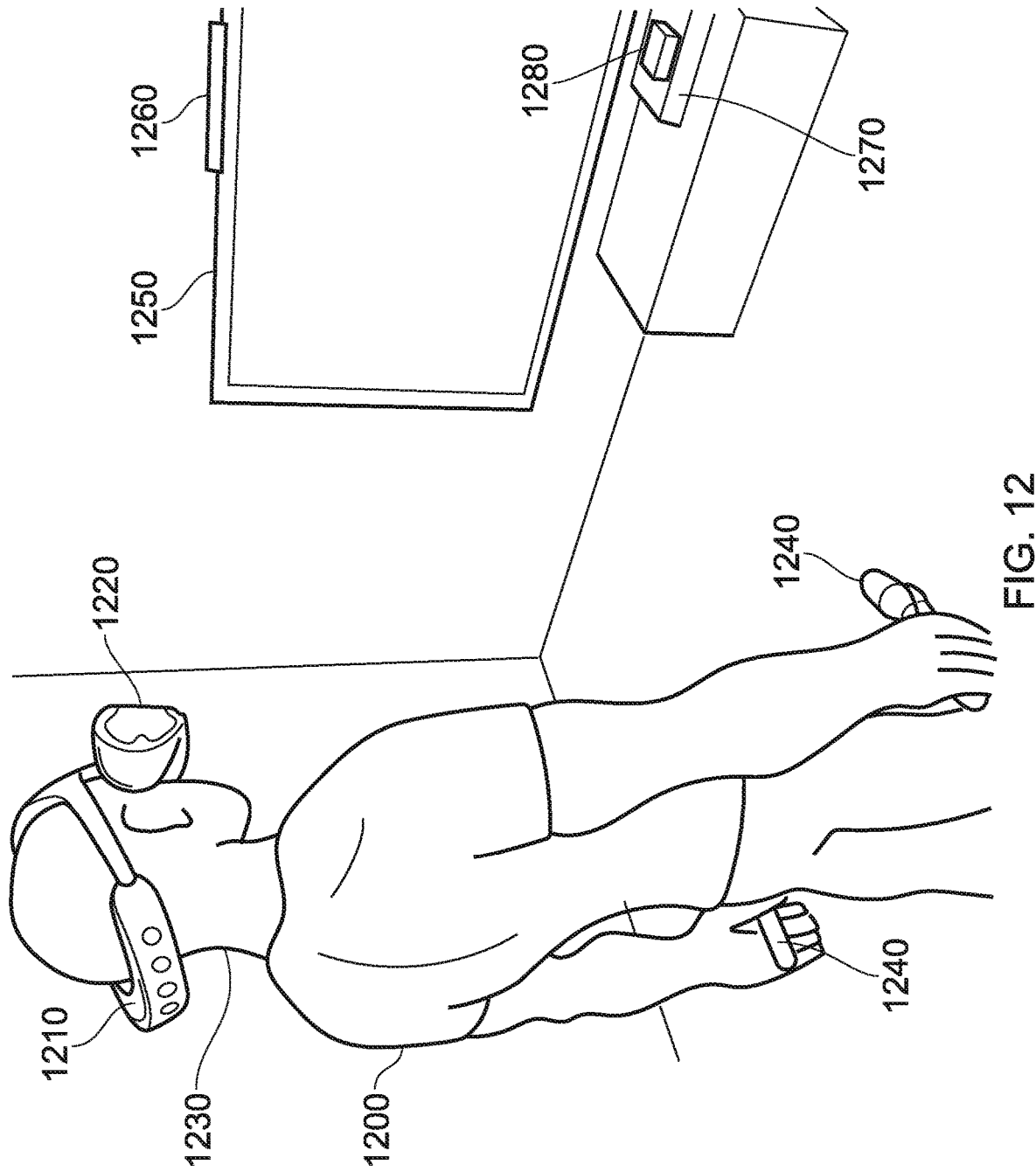
FIG. 12 schematically illustrates a user wearing an HMD and engaged in a video game.

FIG. 12 schematically illustrates a user wearing an HMD and engaged in a video game. In many respects, the arrangement of FIG. 12 is similar to that of FIG. 7 discussed above, but for clarity of the diagram the cabled connections 82, 84 and the optional break-out box 350 of FIG. 7 are not shown. However, FIG. 12 does illustrate an example of the relative positioning of the user and other components in normal operation.

In FIG. 12, the user 1200 is wearing an HMD 1210 having one or more markers 1220 at the front of the HMD (where the term "front" is relative to an orientation of the user's head) and one or more markers 1230 at the rear of the HMD, for example, on a head strap. The user carries a hand held controller 1240 in each hand (in this example). The user is facing a television screen 1250. Of course, it is recognised that when the user is wearing the HMD 1210, the user does not himself observe the television screen. However, facing the television screen provides a natural orientation to other components of the apparatus. The television screen may, as discussed above, provide a so-called "social screen" representing images indicative of game action being played by the user 1200, for the enjoyment of other nearby people who are not wearing HMDs.

Situated around the television screen are a light bar 1260, to be discussed below, a games console 1270 and a camera 1280.

In operation, one or more of the devices (namely the HMD 1210, the console 1270 and the hand-held controllers 1240) have at least one camera and using the camera, the devices detect the positions (or at least the relative positions) of other ones of the devices by means of detecting markers in captured images. To assist with this, the HMD comprises front and rear markers as discussed; the light bar 1260 can provide a marker indicating a location of or relative to the television screen console, and the hand-held controllers 1240 can provide respective markers. Other devices (for example, a second HMD worn by another user, and/or one or more other peripheral devices) can also detect the relative position of devices shown in FIG. 12 and also be detected by those devices. In some examples, the devices share the data defining the relative positions of other devices, as detected using the respective cameras, so that collectively, or via a master device such as the console 1270 handling the collection and amalgamation of the position data, a map or specification of the positions within the game playing area of each of the devices can be derived based on their respective relative position detections.

Figure 13:
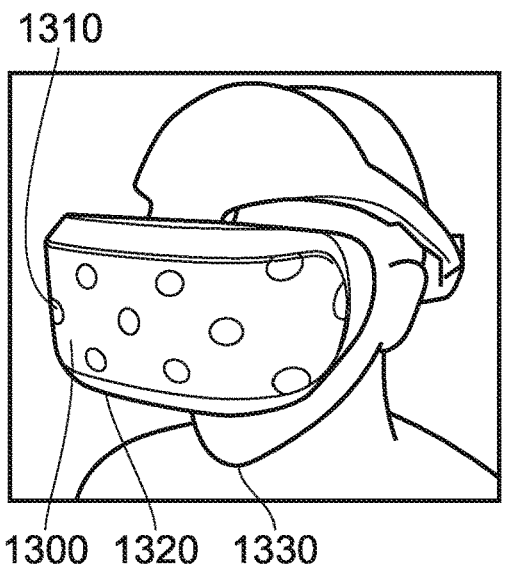
FIGS. 13 and 14 are respective front and rear schematic views of and HMD.
Figure 14:
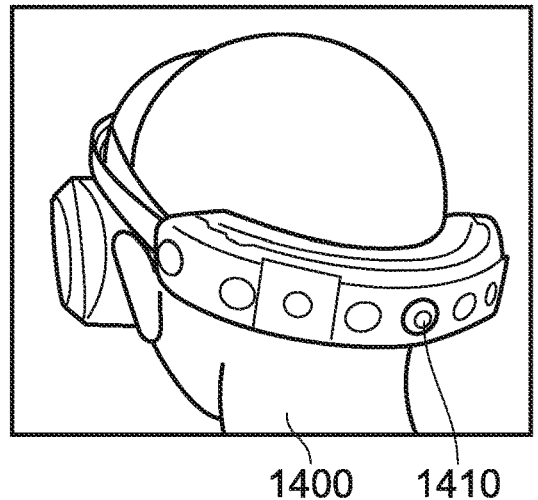

In FIG. 13, the front surface 1300 of the HMD worn by the user has a plurality of LEDs (or other light emitting portions, illuminated portions, or passive features 1310) disposed so that those features can be detected by a camera detected towards the HMD. The LEDs or features 1310 can collectively be considered as a "marker" having multiple marker portions (such as the individual LEDs). A reason for having multiple marker portions is to assist in distinguishing the marker from other image features in the captured images. Also, having multiple marker portions allows an estimation of the separation distance from the camera to the detected marker, in that the distance (in the captured images) between marker portions such as LEDs will be smaller for a more distant HMD (with respect to the camera capturing the images) and larger for a closer HMD. In this way, the marker comprises two or more spatially separated marker portions; and the detector is configured to detect respective image locations of images of the marker portions in the given captured image FIG. 14 schematically illustrates a rear view of the HMD in which a further marker comprising multiple marker portions 1400 is provided. So, if the user turns his back on the console and its associated camera, or if other peripheral devices are disposed behind the user in use, the location of the HMD can still be optically detected using a camera.

Figure 15:
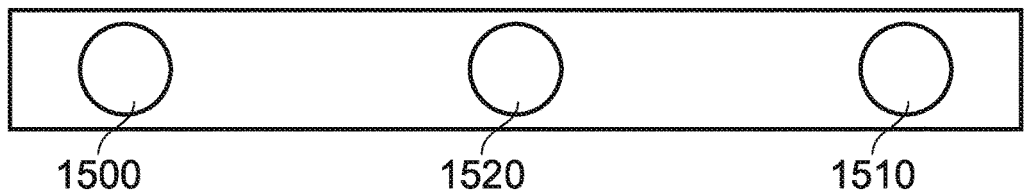
FIG. 15 schematically illustrates a light bar.

FIG. 15 schematically illustrates a light bar of the type shown in FIG. 12, having a marker comprising marker portions (such as LEDs) 1500, 1510. A further LED or indicator 1520 can be provided, for example to give timing information to the other devices in the system. By transmitting an encoded stream of optical pulses using the LED 1520, the optical position detections by other devices in the overall apparatus can be synchronised to a common time frame specified by the console. By positioning the LED 1520 between the marker portions 1500, 1510, its location can be inferred in a captured image even when the LED 1520 is not currently illuminated. So, a pattern of illumination and non-illumination can be detected for the LED 1520 by virtue of its location relative to the marker portions 1500, 1510. Therefore, in examples, an optically detectable indicator (the indicator 1520) comprises an electrically illuminable element such as a light emitting diode.

Figure 16:
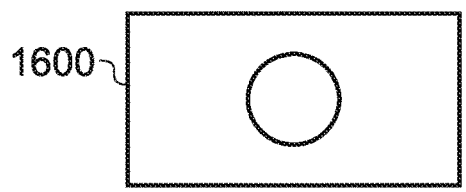
FIG. 16 schematically illustrates a camera.

FIG. 16 schematically illustrates a camera 1600 associated with the console and, in the example of FIG. 12, positioned close to the position of the console.

Figure 17:
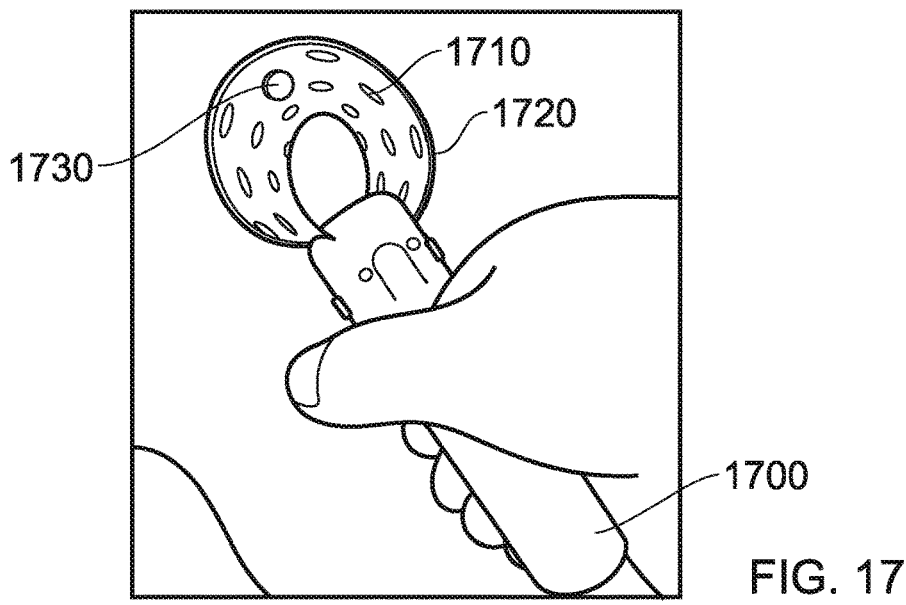
FIG. 17 schematically illustrates a hand-held controller.

FIG. 17 schematically illustrates a hand-held controller 1700 having a marker 1710 formed of multiple marker portions 1720 disposed at its distal end. A camera 1730 may also be provided.

So, each of the devices shown in FIG. 12 may provide a marker having one or more marker portions and a camera. For the console, the camera is the camera 1600 of FIG. 16. For the hand-held controllers, the camera is provided as the camera 1730 of FIG. 17. For the HMD, because the orientation of the HMD can vary dramatically during use, multiple cameras may be provided, such as cameras 1320, 1330 facing forwards and a camera 1410 facing backwards.

Figure 18:
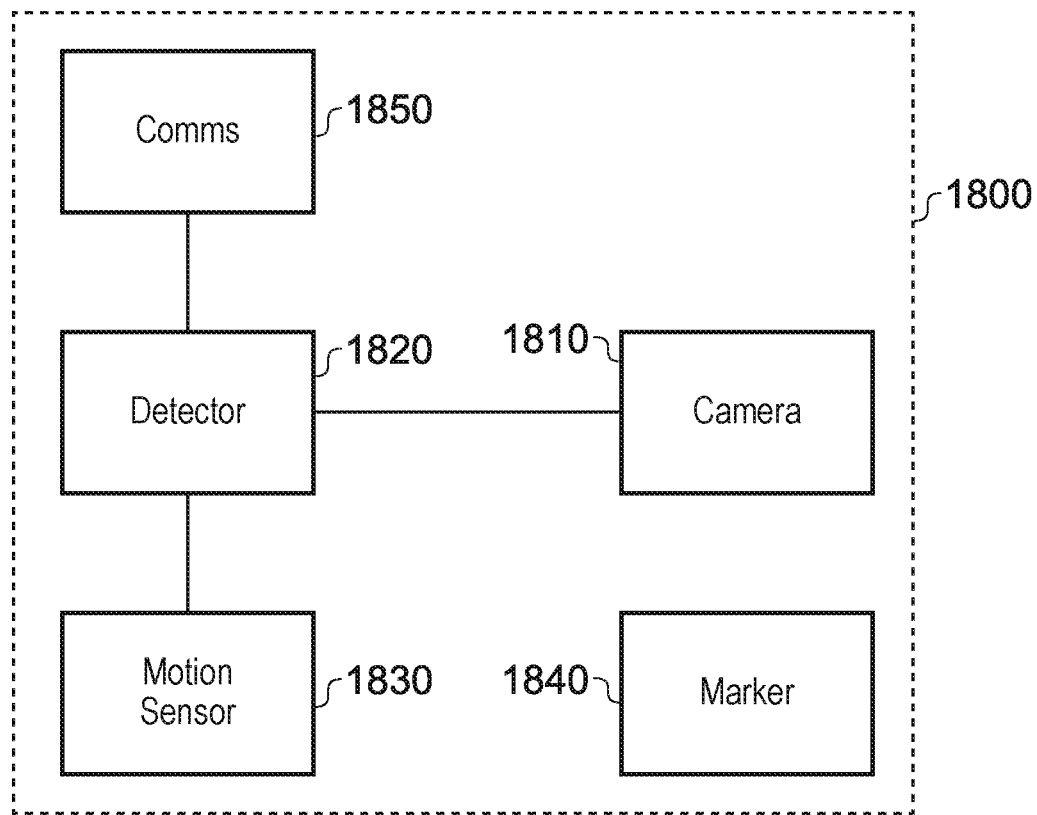
FIG. 18 schematically illustrates a data processing device.

FIG. 18 schematically illustrates a data processing device, for example representing one or more of: the HMD, the handheld controller(s) and the console of FIG. 12. Only those features relative to the current discussion are shown in FIG. 18; other data processing functionality not shown in FIG. 18 may also be provided.

In FIG. 18, the data processing device 1800 comprises a camera 1810 configured to capture successive images according to an image capture period. As discussed below, each image is captured during a respective image capture period and a so-called rolling shutter is used such that respective different portions of the captured image are captured at respective different capture times within the image capture period. A detector 1820 is arranged to detect, from images captured by the camera 1810, information indicating a relative location of a remove marker with respect to the data processing device 1800, and to associate a time stamp with a detected relative location indicating a time at which the relative location was detected. For example, the detector may be configured to detect an image of the marker within a given captured image and to derive a respective timestamp in dependence upon a location within the given captured image of the image of the marker. The detector may be configured to derive the timestamp in response to timing information detected by a processor using techniques (a processor to detect timing information from images captured by the camera of an optically detectable indicator) to be discussed below.

A motion sensor 1830 such as an inertial motion sensor is arranged to detect motion of the data processing device 1800 and optionally to control operation of the detector 1820 in response to the detected motion. The data processing device 1800 may also provide a marker 1840, for example having one or more marker portions as discussed above. A communications ("comms") module 1850 provides data communication with other data processing devices in the overall apparatus.

Figure 19:
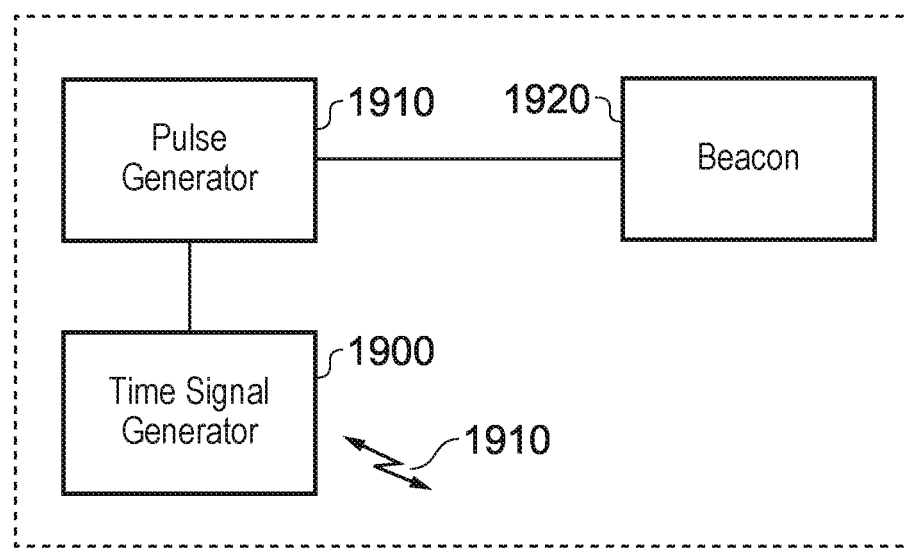
FIG. 19 schematically illustrates a detector.

FIG. 19 schematically illustrates a part of the functionality of a console or base station such as a base station 1270 along with the light bar 1260 discussed above. The functionality shown in FIG. 19 may be provided along with other functionality of the console or base station.

A time signal generator 1900 generates a reference time signal against which time stamps of location detections by other parts of the overall apparatus can be referenced. The time signal generator 1900 can communicate by a communication path 1910 with other parts of the base station or console to be discussed below.

A pulse generator 1910 generates a pattern of pulses of light to be converted from a pulse signal into a light output by an indicator 1920, such as the indicator 1520 of FIG. 15.

Figure 20:
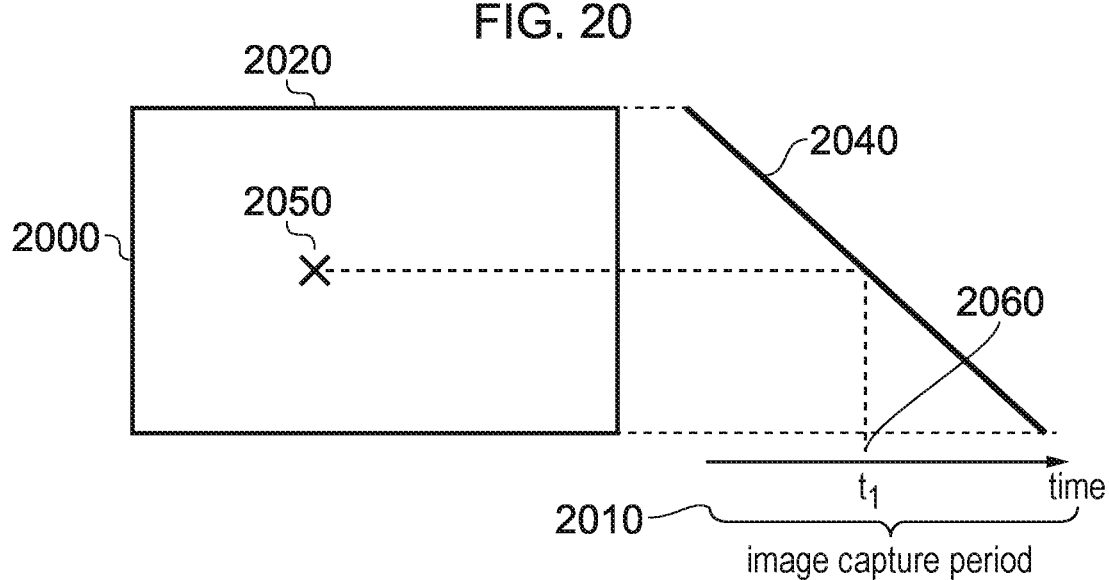
FIG. 20 is a schematic diagram illustrating the operation of a rolling camera shutter.

FIG. 20 is a schematic diagram illustrating the operation of a rolling camera shutter.

With a so-called rolling shutter, as mentioned above, an image such as the image 2000 of FIG. 20 is captured during an image capture period 2010. Different portions of the image are captured at different respective times within the image capture period.

The example of FIG. 20 relates to a vertical-scanning rolling shutter such that the image 2000 is captured on a line-by-line basis (the lines being lines of pixels, for example) such that each line is captured at a different time within the image capture period. For example, the rolling shutter can be implemented from the top 2020 to bottom 2030 of the image using an example temporal relationship such as that represented by a curve 2040 so that the first line of pixels to be captured and output is a top line as drawn, and the last is a bottom line as drawn. So, for any vertical location such as an example location 2050 within the image, a corresponding capture time $t_1$ 2060 can be derived using the relationship defined by the curve 2040. In these examples, therefore, the camera is configured to capture the successive images as multiple lines of pixels, such that respective different lines of pixels of the captured image are captured at respective different capture times within the image capture period.

The rolling shutter can be implemented in a vertical or a horizontal sense, and in either direction. So, in other embodiments, the rolling shutter might be such that the bottom line of pixels of the image 2000 is captured first and the top line is captured last.

In further examples, there does not necessarily need to be a linear progression such that lines or rows of pixels (or indeed columns of pixels) are captured in a monotonic progression across or up or down the image. However, the present examples use such a linear progression.

Rolling shutters can be implemented mechanically or electronically. Many examples of image sensors using electronic rolling shutters employ so-called CMOS sensors. This is the type of sensor used in the present examples.

It follows from the relationship defined by the curve 2040 between (in this example) vertical image position and time within the image capture period 2010 that a time stamp can be associated with an image feature in the captured image according to the vertical (in this example) position of that image feature within the captured image.

Figure 21:
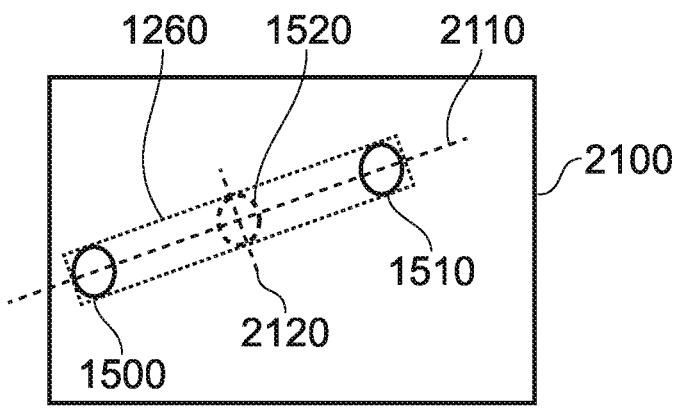
FIGS. 21 and 22 schematically illustrate the processing of an image of a sensor bar.

FIG. 21 schematically illustrates the detected location in a captured image 2100 of an image of a light bar 1260 of the type shown in FIG. 12 and described with reference to FIG. 15.

As discussed above, the light bar comprises a pattern of marker portions such as LEDs 1500, 1510. In at least some examples, the LEDs 1500, 1510 are permanently illuminated (where "permanently" refers to the duration of the sensing operation and/or the game play, at least). In the captured image 2100, using the example pattern of marker portions shown, the centre-to-centre line 2110 between the centres of the detected images of the marker portions 1500, 1510 defines the longitudinal axis of the light bar 60 in the captured image. At a mid-point 2120 between the centres of the detected images of the marker portions 1500, 1510, an intersection with the line 2110, lies the expected position of the indicator 1520. However, as discussed above, the indicator is not always illuminated (which is to say, it is illuminated intermittently during normal operation) and in fact provides communication of timing information by a pattern of illuminations and non-illuminations. So, in the particular image shown in FIG. 21, the indicator may be illuminated or may not be illuminated depending on the time at which the image was captured, relative to the timing of the pattern of illumination of the indicator 1520. However, the location of the marker portions, 1500, 1510 allows the expected position in the image of the indicator 1520 to be detected even when the indicator is not currently illuminated.

Therefore, in these examples, the optically detectable indicator has one or more associated marker portions. The processor (of the HMD, for example) can be configured to detect the position, in a captured image, of the optically detectable indicator with reference to image positions of the one or more associated marker portions. In some examples, the marker portions comprise two or more marker portions spatially separated from one another and from the optically detectable indicator; and the processor is configured to detect respective image locations of images of the marker portions in the given captured image.

Figure 22:
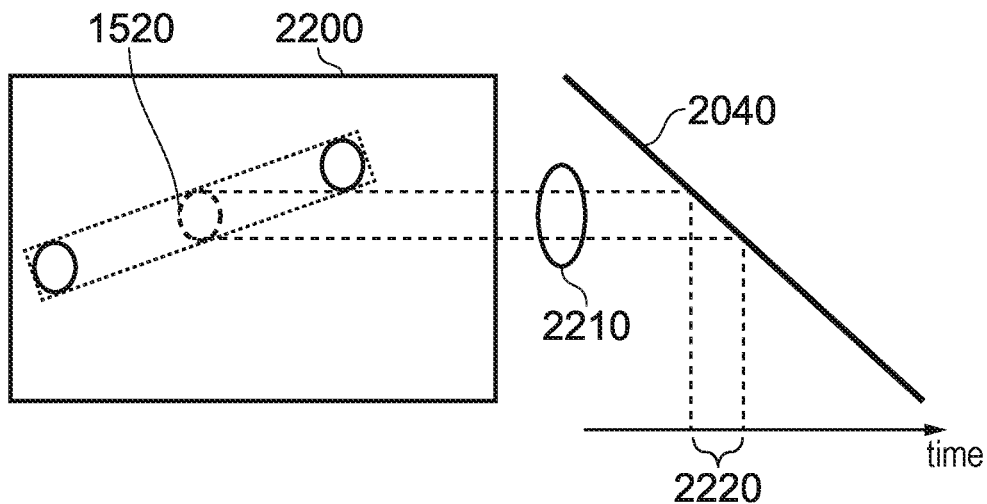

FIG. 22 schematically illustrates the light bar at a similar position in the captured image (an image 2200) to its position in the image 2100, and also the curve 2040 defining an example relationship between time and the vertical position within the image for an image captured by a rolling shutter camera. Broken lines 2210 schematically illustrate a mapping between the vertical extents of the detected position of the indicator 1520 and a period 2220 within the overall image capture period at which the indicator itself is captured.

It can therefore be seen that in order for an image of an illuminated indicator 1520 to be captured as part of the overall image 2200, the indicator must be illuminated during the period 2220. If the indicator is illuminated during that period and also during other periods, the image 2200 will contain an image of the illuminated indicator. However, if the indicator 1520 is not illuminated not during the period 2220, then irrespective of whether it is illuminated during other parts of the image capture period, the image 2200 will not contain an image of the illuminated indicator.

Figure 23:
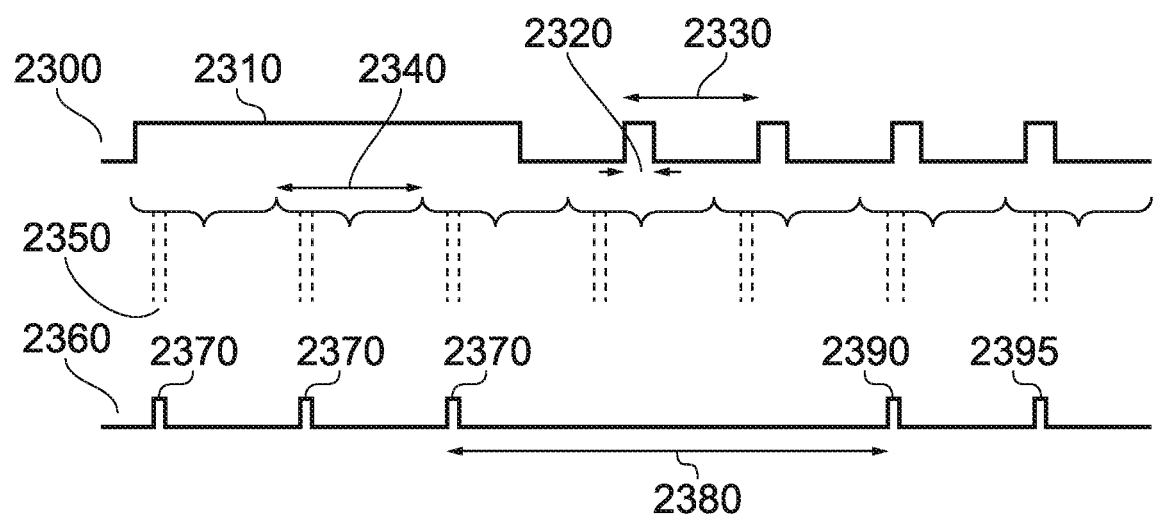
FIG. 23 is a schematic timing diagram.

FIG. 23 schematically illustrates timing relationships between illuminations of the indicator 1520 and image capture periods of the camera discussed above. A top row 2300 of FIG. 23 schematically illustrates a pattern of illumination of the indicator 1520, purely by way of example.

The indicator 1520 provides an example of an optically detectable indicator having multiple optically detectable states and configured to transition between the multiple optically detectable states according to a transition pattern having interspersed periods in the multiple optically detectable states. In the example of the indicator 1520, the optically detectable indicator has a first and a second optically detectable state. these two states can be "on" and "off", such that (for example) the first optically detectable state is represented by illumination of the optically detectable indicator. However, more than two such states could be used, such as "red", "green" and "off". Or just "red" and "green" (for example) could be used as the optically detectable states. In other examples, the indicator 1520 can be a reflective marking such as a MEMS (micro-electromechanical system) reflector or reflector array, controllable between (for example) a reflective and a substantially non-reflective state.

The example pattern of illumination comprises a first long pulse or reference period 2310 encompassing at least a whole image capture period and, in some examples, more than one successive image capture period.

Following the long pulse 2310 is a succession of shorter or second pulses, each having a pulse length 2320, of less than one image capture period and a separation 2330 which is different to the image capture period. In the present example, the separation 2330 is less than the image capture period 2340. However, the separation 2330 could be more than the image capture period 2340.

These pulses or periods together form an example of a transition pattern including a reference period and two or more second periods which are shorter than the image capture period and which are separated by a separation period different to the image capture period. For example, the transition pattern can be such that the optically detectable indicator is in the first optically detectable state in the reference period and in the second periods, and in the second optically detectable state at other times. However, the opposite polarity could be used, or (for example) a first state (such as "red" could be used for the reference pulse, a second state (such as "green") could be used for the second pulses, and a third state (such as "off") could be used for the interspersed periods. The skilled person will appreciate that various different permutations are possible.

Pairs of broken vertical lines such as a pair 2350 indicate, using a similar format to that employed in FIG. 22, the relevant time period during the image capture period at which the image location corresponding to the indicator 1520 is captured. So, as discussed above, if the indicator is illuminated during the time period indicated by the broken lines 2350, the corresponding image portion will show an image of the indicator in an illuminated form. If the indicator is illuminated at any other time during the image capture period but not the period indicated by the broken lines 2350, then the indicator will not appear in the image in illuminated form.

It is assumed for FIG. 23 that the relative orientation and position of the camera and the indicator do not change during the period of time represented by the horizontal extent of FIG. 23. Other situations in which such a change does occur will be discussed below.

The illumination or non-illumination in the captured image of the indicator 1520 is illustrated by a bottom row 2360 of FIG. 23. During the long pulse 2310, the indicator is captured as illuminated as illustrated by the top-hat curves 2370. There then follows a period 2380 between the last of the captured illuminations corresponding to the long pulse 2310 and the first 2390 of one or more occasions at which the indicator is again captured as illuminated. The period 2380 depends on two main factors: a relationship between the repetition period 2330 of the pulses and the length of the image capture period 2340: and any intervening changes in the location within the image of the position of the indicator 1520. In FIG. 23, a first illumination 2390 and a second illumination 2395 are shown, during both of which the period of time indicated by the broken vertical lines corresponds with (at least in part) the illumination of the indicator in one of the short pulses.

Figure 24:
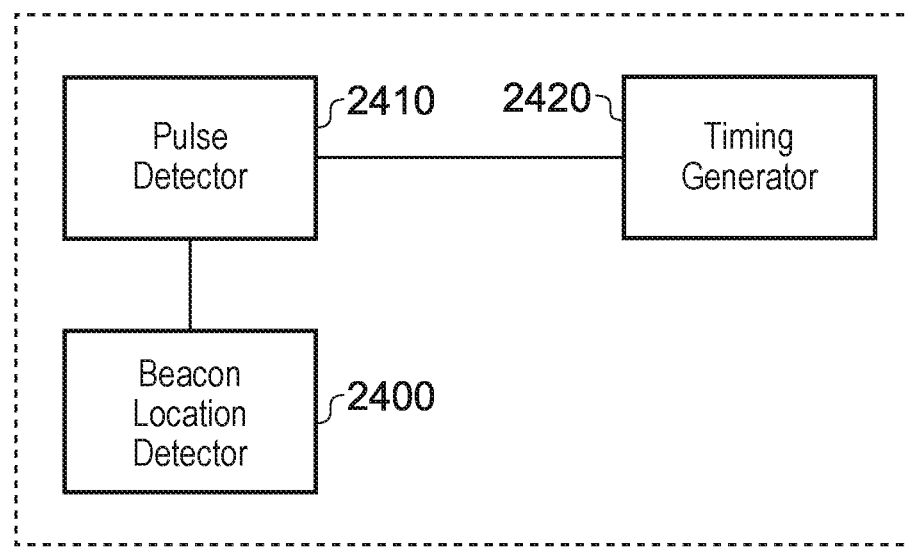
FIG. 24 schematically illustrates an apparatus.

FIG. 24 schematically illustrates part of the functionally of the detector 1820 of FIG. 18. The detector comprises a indicator location detector 2400 arranged to detect the marker portions indicating the extent of the light bar as discussed above, and from these to detect the centre point (in this particular example) indicative of the location of the indicator 1520 whether or not the indicator 1520 is currently illuminated. A pulse detector 2410 detects whether the indicator is illuminated or not illuminated at the detected position in each successive frame, and in particular detects the time period 2380 of FIG. 23. A timing generator 2420 generates timing information aligned to that specified by the pattern of pulses of the indicator (and therefore aligned to the timing information used at the main console) for use in the generation of a time stamp to accompany each detected location of a marker portion.

An example situation in which the light bar and the indicator moves during the process discussed above will now be described.

Figure 25:
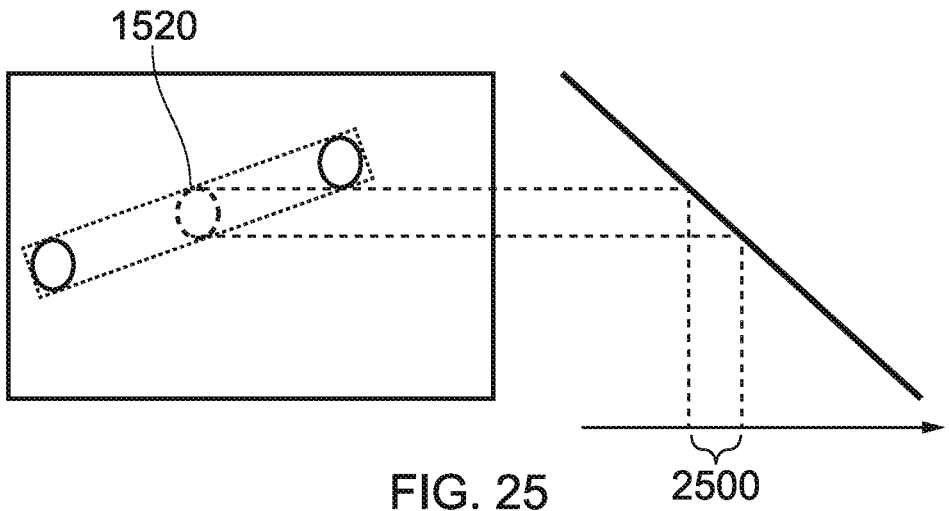
FIGS. 25 and 26 schematically illustrate the processing of an image of a sensor bar.

FIG. 25 schematically illustrates a light bar at the same location as that shown in FIG. 22 discussed above, giving rise to a period 2500 during which the indicator 1520 must be illuminated, within the image capture period, in order to be captured as being illuminated.

Figure 26:
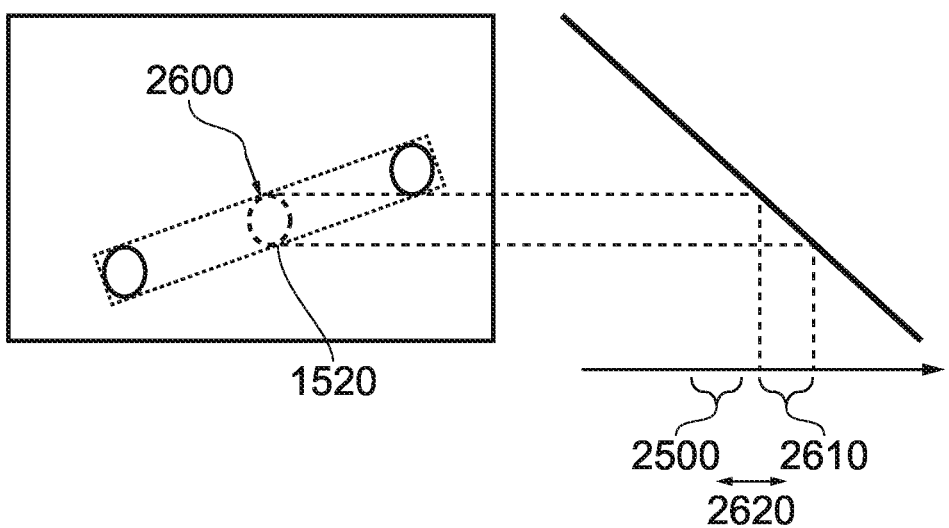

In FIG. 26, the light bar has moved in a direction 2600, which in terms means that the location of the indicator 1520 has moved, such that instead of the time period 2500, the relevant time period is a period 2610. A time difference 2620 applies between the original time period 2500 detected in respect of the image of FIG. 25 and the revised time period 2610 detected in respect of the image of FIG. 26.

Figure 27:
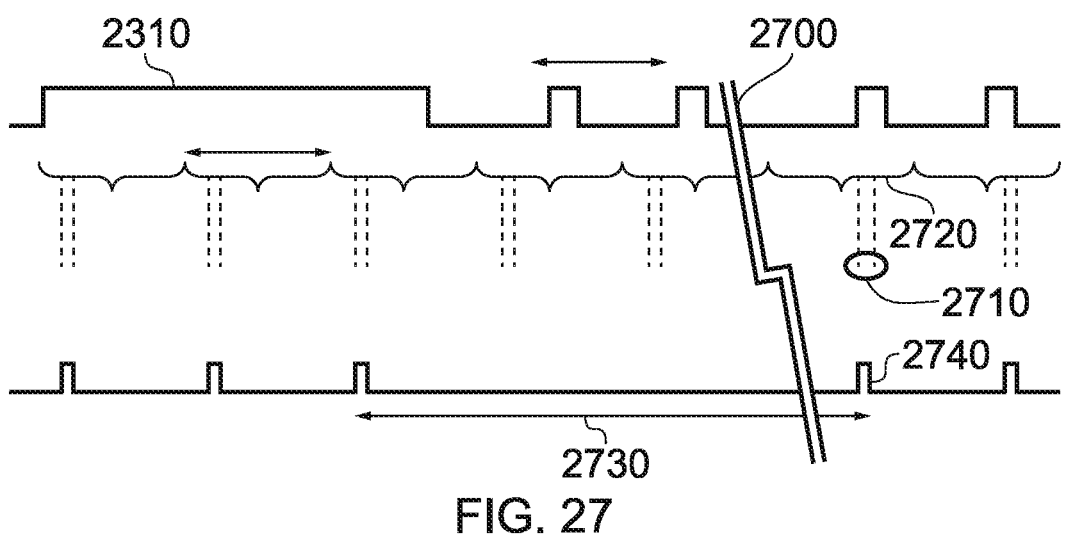
FIG. 27 is a schematic timing diagram.

FIG. 27 is similar to FIG. 23 but, after a pair of lines 2700 indicating a gap of indefinite length, the broken lines 2710 indicating the time period of which the indicator has to be captured in order to show up as illuminated in the image have moved within an image capture period 2720 to correspond to the change indicated in FIG. 26. Once again, even taking into account that movement, a time period 2730 between the last of the captured occasions relating to the long pulse 2310 and the first occasion 2740 at which the short pulses captured can be detected and is processed as shown below.

Consider the signal 2300 as the reference pulse signal TP.
2310 is the long pulse TL
2320 is the short pulse TS 2330 is the reference unit pulse period TU
2340 is the camera VSYNC interval TC Tv is a multiplier representing the reference pulse rate being slightly out of synchronisation with the camera frame rate, for example Tv=1.01

The length of TU is set to the TC*Tv so that it is out of sync with the camera but in a known direction.

The camera and tracker have been configured so that the camera can track the position of one or more LED's accurately.

The algorithm is as follows:

Long: When the camera observes a visible pulse (LED on) it will copy the time into S1. Call this frame 0.

In the next frame, if the camera observes another pulse, S1 is used as start pulse TL, if the camera does not observe another pulse we go back to the previous detection at the label "Long" above.

Short: For the next number of frames, the system waits until the camera sees another pulse, whilst counting the number of frames CF lapsed.

If another pulse is observed it will copy the time into S2

If in the next following frame (after the detection just mentioned) another pulse is observed, another long pulse TL has been entered (which is incorrect—the short pulse must have been missed), so copy S2→S1 and go back to the label "Short"

If the next following frame does not contain a pulse, a TS has been identified. The system waits until it reaches the next long pulse TL and copies the time of the TS to S3 it is known from the screen vertical position that the short pulse was detected at the time of VSYNC+(screen y offset x scaling factor for vertical scanning rate)

The following are then known:
the time from the short pulse to the next long pulse.
the time from the last long pulse to the short pulse The overall aim is to synchronise multiple devices, so from a host which collects all the pulse observations from the different devices we can determine which pulses were detected at which positions and therefore derive the time variations between the rolling shutters.

For example, device one observed the third short pulse at 25% down the screen, and therefore there were 2 frames until the next long pulse. For a 60 Hz frame this means the time until the long pulse VSYNC will have been 0.25*16.67+(2.0−(1.0−0.25)*16.67=4.1675+ 29.155=~33.3225 ms.

Therefore, in these examples, the processor is configured to detect the timing information in response to a number of image capture periods between capture of an image of the optically detectable indicator in the reference period and capture of an image of the optically detectable indicator in a second period.

Also, in these examples, the processor is configured to detect the timing information in response to a position, within a given captured image, of an image of the optically detectable indicator.

Figure 28:
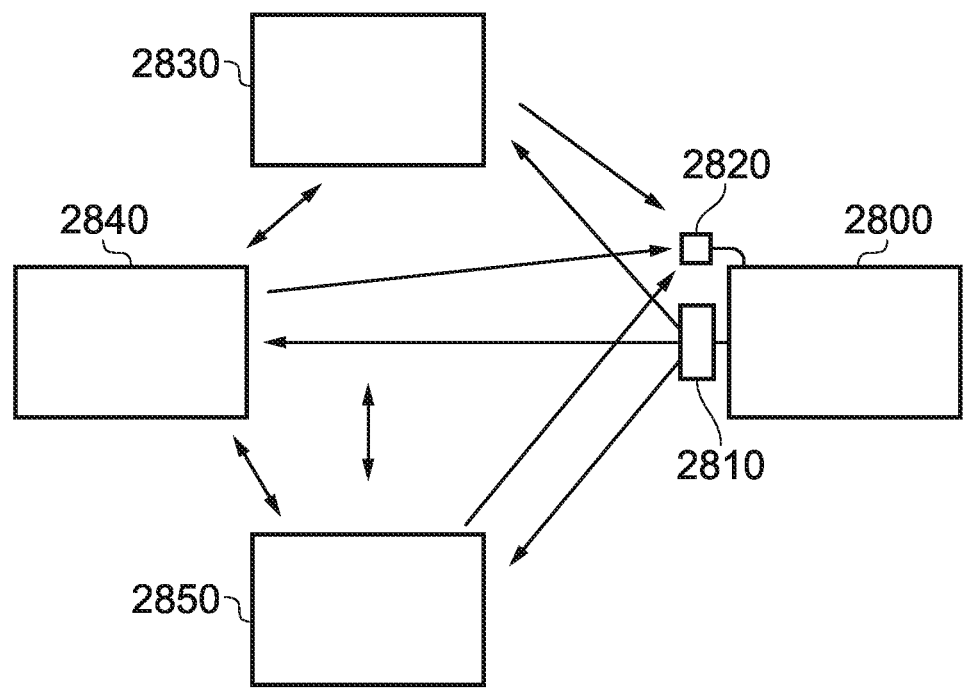
FIG. 28 schematically illustrates a system.

FIG. 28 schematically illustrates an example data processing apparatus comprising a games console 2800 having an associated light bar 2810 and camera 2820, and three (in this example) peripheral devices 2830, 2840, 2850.

Each of the peripheral devices 2830 . . . 2850 captures images of the light bar 2810 and from those images detects (a) the relative location (relative to the particular device) of the light bar and timing information from the indicator 1520 on the light bar. The camera 2820 captures images of each of the devices 2830 . . . 2850 and detects, from the point of view of the games console 2800, the relative location of each of the devices. Also, each device 2830 . . . 2850 can detect the relevant location of each other device.

All of the detective locations are associated with respective time stamps and the data representing the locations and time stamps can be shared between the devices and flash hall with the games console 2800.

Figure 29:
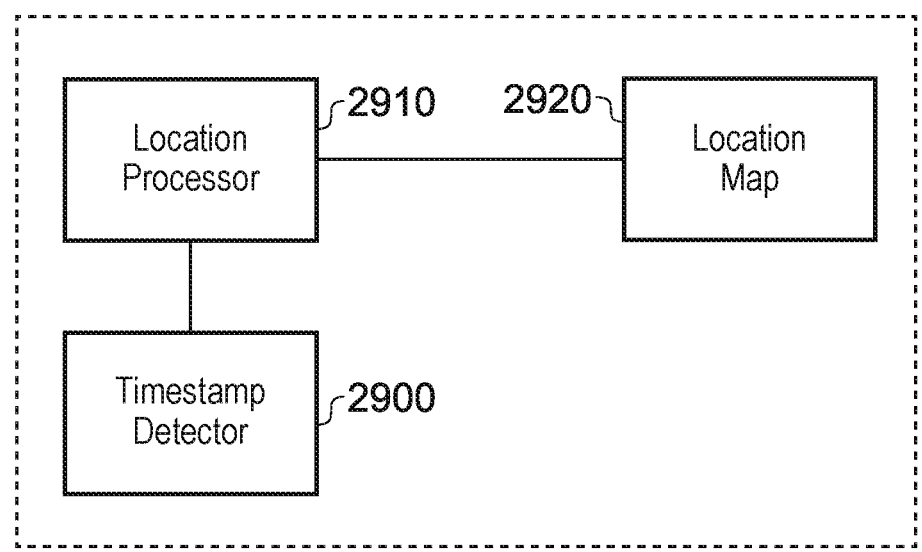
FIG. 29 schematically illustrates an apparatus.

FIG. 29 schematically illustrates part of the functionally of the games console 2800, comprising a time stamp detector 2900 configured to detect the time stamps of locations detections made by various devices 2830 . . . 2850 and communicated to the games console 2800, along with time stamps of detections made by the games console 2800 itself, and a location processor 2910 configured to the relative location information provided by each location detection at particular times represented by the time stamps so as to build a location map 2920 indicative of the locations of the cohort of devices 2800, 2830, 2840, 2850 in the apparatus of FIG. 28.

Figure 30:
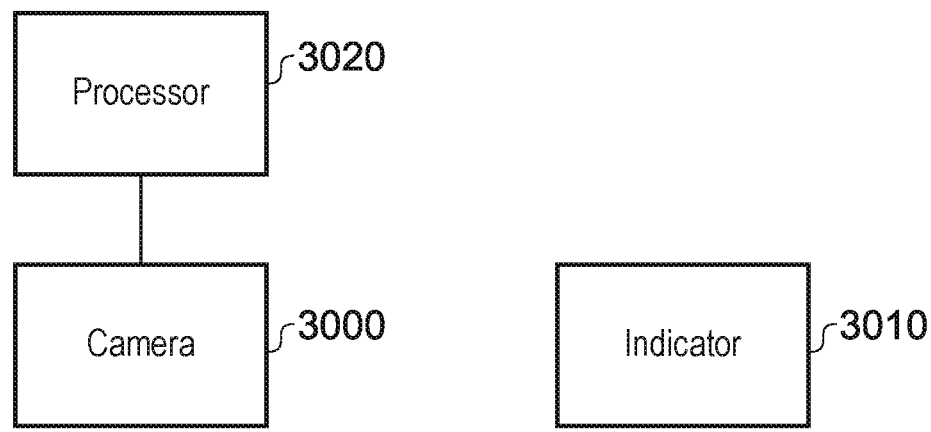
FIG. 30 schematically illustrates a data processing apparatus.

FIG. 30 schematically illustrates data processing apparatus of the type discussed above (for example formed of a base station or console and an HMD), comprising:

a camera 3000 (for example, at the HMD) to capture successive images according to an image capture period;

an optically detectable indicator 3010 (such as the indicator discussed above, for example at the light bar associated with the base station or console) having multiple optically detectable states and configured to transition between the multiple optically detectable states according to a transition pattern having interspersed periods in the multiple optically detectable states;

the transition pattern including a reference period and two or more second periods which are shorter than the image capture period and which are separated by a separation period different to the image capture period; and a processor 3020 (for example, at the HMD) to detect timing information from images captured by the camera of the optically detectable indicator.

Accordingly, using the notation of FIG. 30, an HMD or other device can provide an example of a data processing device comprising:

a camera 3000 to capture successive images according to an image capture period of an optically detectable indicator having multiple optically detectable states and configured to transition between the multiple optically detectable states according to a transition pattern having interspersed periods in the multiple optically detectable states, the transition pattern including a reference period and two or more second periods which are shorter than the image capture period and which are separated by a separation period different to the image capture period; and a processor 3020 to detect timing information from images captured by the camera of the optically detectable indicator.

Figure 31:
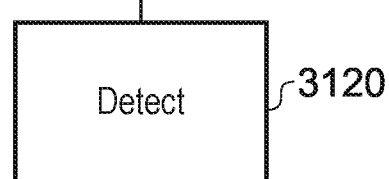

FIG. 31 is a schematic flowchart illustrating a data processing method, for example performed by the apparatus of FIG. 29, comprising:

capturing (at a step 3100) successive images according to an image capture period;

transitioning (at a step 3110) an optically detectable indicator having multiple optically detectable states between the multiple optically detectable states according to a transition pattern having interspersed periods in the multiple optically detectable states, the transition pattern including a reference period and two or more second periods which are shorter than the image capture period and which are separated by a separation period different to the image capture period; and detecting (at a step 3120) timing information from images captured by the camera of the optically detectable indicator.

Figure 32:
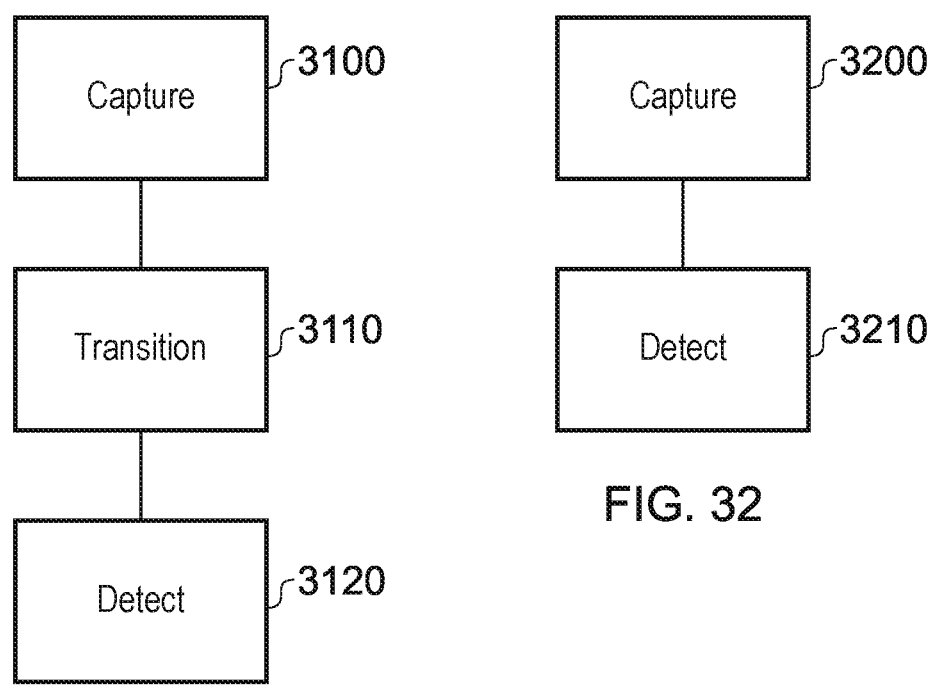
FIGS. 31 and 32 are schematic flowcharts illustrating respective methods.

FIG. 32 is a schematic flowchart illustrating a data processing method, for example performed by an HMD, comprising:

capturing (at a step 3200) successive images according to an image capture period of an optically detectable indicator having multiple optically detectable states and configured to transition between the multiple optically detectable states according to a transition pattern having interspersed periods in the multiple optically detectable states, the transition pattern including a reference period and two or more second periods which are shorter than the image capture period and which are separated by a separation period different to the image capture period; and detecting (at a step 3210) timing information from images captured by the camera of the optically detectable indicator.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. An apparatus for processing data, comprising:
a camera to capture successive images, each given image among the successive images being captured during a respective image capture period, during which different portions of the given image are captured at different capture times within the respective image capture period;
an optically detectable indicator located within the successive images, the optically detectable indicator having multiple optically detectable states and configured to transition between the multiple optically detectable states according to a transition pattern having interspersed periods in the multiple optically detectable states, the transition pattern including a reference period and two or more second periods which are shorter than the respective image capture period and which are separated by a separation period different to the respective image capture period; and
a processor operating to detect timing information from the successive images of the optically detectable indicator,
wherein the processor is configured to detect the timing information in response to a position, within a given captured image among the successive images, of an image of the optically detectable indicator.

2. The apparatus according to claim 1, in which the processor is configured to detect the timing information in response to a number of image capture periods between capture of an image of the optically detectable indicator in the reference period and capture of an image of the optically detectable indicator in a second period.

3. The apparatus according to claim 1, in which the optically detectable indicator has a first optically detectable state and a second optically detectable state.

4. The apparatus according to claim 3, in which the transition pattern is such that the optically detectable indicator is in the first optically detectable state in the reference period and in the second periods, and in the second optically detectable state at other times.

5. The apparatus according to claim 4, in which the optically detectable indicator comprises an electrically illuminable element.

6. The apparatus according to claim 5, in which the optically detectable indicator comprises a light emitting diode.

7. The apparatus according to claim 5, in which the first optically detectable state is represented by illumination of the optically detectable indicator.

8. The apparatus according to claim 1, in which the optically detectable indicator has one or more associated marker portions.

9. Apparatus according to claim 8, in which the processor is configured to detect the position, in a captured image, of the optically detectable indicator with reference to image positions of the one or more associated marker portions.

10. The apparatus according to claim 9, in which:
the marker portions comprise two or more marker portions spatially separated from one another and from the optically detectable indicator; and
the processor is configured to detect respective image locations of images of the marker portions in the given captured image.

11. The apparatus according to claim 8, comprising:
a detector to detect, from images captured by the camera, information indicating a relative location of a remote marker with respect to the camera, and to associate a timestamp with a detected relative location indicating a time at which the relative location was detected.

12. The apparatus according to claim 11, in which the detector is configured to detect an image of the marker within a given captured image and to derive a respective timestamp in dependence upon a location within the given captured image of the image of the marker.

13. The apparatus according to claim 12, in which the detector is configured to derive the timestamp in response to timing information detected by the processor.

14. The apparatus according to claim 1, in which the camera is provided at a head mountable display.

15. A data processing device comprising:
a camera to capture successive images, each given image among the successive images being captured during a respective image capture period, during which different portions of the given image are captured at different capture times within the respective image capture period, and each respective image capture period being of an optically detectable indicator located within the successive images, the optically detectable indicator having multiple optically detectable states and configured to transition between the multiple optically detectable states according to a transition pattern having interspersed periods in the multiple optically detectable states, the transition pattern including a reference period and two or more second periods which are shorter than the respective image capture period and which are separated by a separation period different to the respective image capture period; and
a processor to detect timing information from the successive images of the optically detectable indicator,
wherein the processor is configured to detect the timing information in response to a position, within a given captured image among the successive images, of an image of the optically detectable indicator.

16. The data processing device according to claim 15, wherein the device is a head mountable display.

17. A data processing method comprising:
capturing successive images, each given image among the successive images being captured during a respective image capture period, during which different portions of the given image are captured at different capture times within the respective image capture period;
transitioning an optically detectable indicator located within the successive images, the optically detectable indicator having multiple optically detectable states between the multiple optically detectable states according to a transition pattern having interspersed periods in the multiple optically detectable states, the transition pattern including a reference period and two or more second periods which are shorter than the respective image capture period and which are separated by a separation period different to the respective image capture period; and
detecting timing information from the successive images of the optically detectable indicator,
wherein the processor is configured to detect the timing information in response to a position, within a given captured image among the successive images, of an image of the optically detectable indicator.

18. A data processing method comprising:
capturing successive images, each given image among the successive images being captured during a respective image capture period, during which different portions of the given image are captured at different capture times within the respective image capture period, and each respective image capture period being of an optically detectable indicator located within the successive images, the optically detectable indicator having multiple optically detectable states and configured to transition between the multiple optically detectable states according to a transition pattern having interspersed periods in the multiple optically detectable states, the transition pattern including a reference period and two or more second periods which are shorter than the respective image capture period and which are separated by a separation period different to the respective image capture period;
detecting timing information from the successive images of the optically detectable indicator,
wherein the processor is configured to detect the timing information in response to a position, within a given captured image among the successive images, of an image of the optically detectable indicator.

19. A non-transitory machine-readable storage medium containing computer software which, when executed by a computer, causes the computer to perform a data processing method, comprising:
capturing successive images, each given image among the successive images being captured during a respective image capture period, during which different portions of the given image are captured at different capture times within the respective image capture period;
transitioning an optically detectable indicator located within the successive images, the optically detectable indicator having multiple optically detectable states between the multiple optically detectable states according to a transition pattern having interspersed periods in the multiple optically detectable states, the transition pattern including a reference period and two or more second periods which are shorter than the respective image capture period and which are separated by a separation period different to the respective image capture period; and
detecting timing information from the successive images of the optically detectable indicator,
wherein the processor is configured to detect the timing information in response to a position, within a given captured image among the successive images, of an image of the optically detectable indicator.

20. A non-transitory machine-readable storage medium containing computer software, which when executed by a computer, causes the computer to perform a data processing method, comprising:
capturing successive images, each given image among the successive images being captured during a respective image capture period, during which different portions of the given image are captured at different capture times within the respective image capture period, and each respective image capture period being of an optically detectable indicator located within the successive images, the optically detectable indicator having multiple optically detectable states and configured to transition between the multiple optically detectable states according to a transition pattern having interspersed periods in the multiple optically detectable states, the transition pattern including a reference period and two or more second periods which are shorter than the respective image capture period and which are separated by a separation period different to the respective image capture period;
detecting timing information from the successive images of the optically detectable indicator,
wherein the processor is configured to detect the timing information in response to a position, within a given captured image among the successive images, of an image of the optically detectable indicator.

* * * * *